United States Patent

[11] 3,593,605

| | | | |
|---|---|---|---|
| [72] | Inventor | Sylvester Ray Cudnohufsky | |
| | | Pontiac, Mich. | |
| [21] | Appl. No. | 794,884 | |
| [22] | Filed | Jan. 29, 1969 | |
| [45] | Patented | July 20, 1971 | |
| [73] | Assignee | The Babcock & Wilcox Company | |
| | | New York, N.Y. | |

[54] APPARATUS FOR DYNAMICALLY BALANCING A ROTATING WORKPIECE
8 Claims, 8 Drawing Figs.

[52] U.S. Cl.................................................... 82/40 R,
   279/1, 82/DIG 8
[51] Int. Cl........................................................ B23b 33/00
[50] Field of Search........................................... 82/40, 911,
   DIG. 8; 279/1 ME, 1 J, 1 C; 74/573

[56] References Cited
UNITED STATES PATENTS

| | | | | |
|---|---|---|---|---|
| 1,634,396 | 7/1927 | Cole............................. | | 82/40 |
| 2,861,471 | 11/1958 | Kronenberg................... | | 279/1 |

*Primary Examiner*—Leonidas Vlachos
*Attorney*—J. Maguire

ABSTRACT: A dynamic balancing device for the mass production of rotating unbalanced workpieces, wherein a counterbalance element is attached to each workpiece during the working procedure to compensate for the unbalance. The counterbalancing effect is preferably applied perpendicular to the axis of workpiece rotation, and in the same plane as the center of gravity of the workpiece unbalance to avoid runout of the workpiece during the machining process.

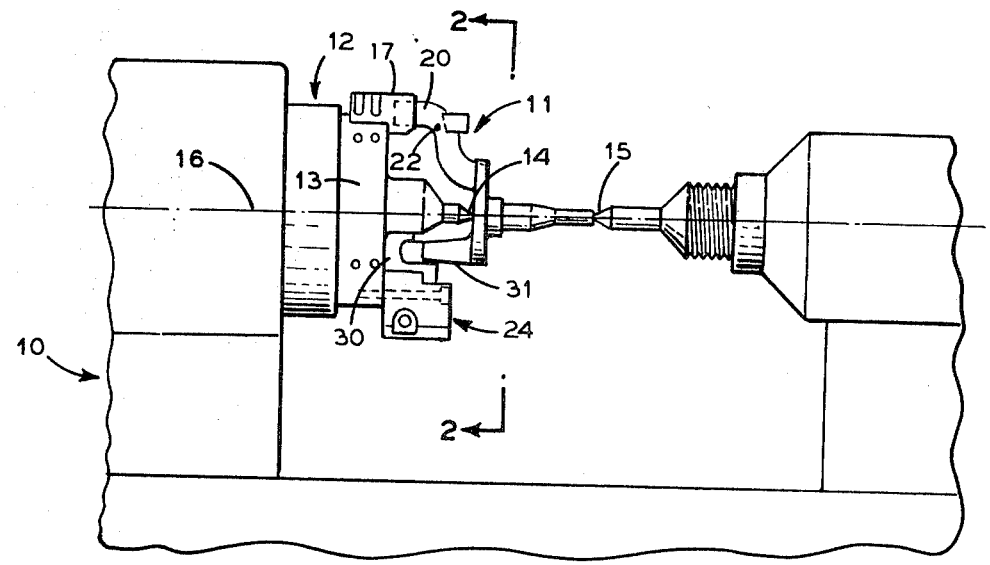

APPARATUS FOR DYNAMICALLY BALANCING A ROTATING WORKPIECE

BACKGROUND AND SUMMARY OF THE INVENTION

The present invention relates to the machining of a rotating workpiece and more particularly to a counterbalance arrangement for dynamically balancing a workpiece mounted on a work rotating tool.

Mass producers of precision machined parts have traditionally had difficulty in setting up machine tools capable of machining a rotating workpiece where the workpiece is unbalanced. The difficulty usually relates to the necessity of operating the rotating work tool at a relatively low rate of rotation so that the unbalance forces will be small, in order to maintain the necessary close tolerance machining of the part. However, often the economically desirable increased output from a given tool, or perhaps the machining characteristics of tool and material would require a high rate of rotation. Usually, the unbalance of such workpieces will be axially displaced along the axis of rotation with respect either to the clamping areas or to the center of gravity of the workpiece. Attempts to compensate for the unbalance have heretofore been directed to using a counterbalance mounted on a rotating part of the machine tool such as the chuck or faceplate, so that the location of unbalance forces of the workpiece and of the counterbalance on the machine tool are axially spaced relative to each other. Under these conditions a rotating dynamic unbalance is set up which induces vibration both in the tool and in the workpiece and materially reduces the capability of the machine to produce a workpiece to the desired tolerance unless the speed of rotation is drastically reduced. Thus, the conventional method, which achieves static but not dynamic balance, is inadequate.

In the present invention, I have developed a rotating counterweight arrangement which engages the workpiece and is positioned so as to be substantially diametrically opposite the unbalanced part of the workpiece in its relation to the center of gravity of the rotating part. In effect, the center of gravity of the workpiece's unbalance mass and of the counterbalance will lie substantially a common plane normal to the axis of rotation. Thus, to achieve a balance of the forces acting on the workpiece, the counterbalance weight multiplied by the distance of the center of gravity of the counterbalance weight from the machine's axis must be equal to the unbalance weight of the workpiece multiplied by the radius of the center of gravity of the unbalance weight. This relation may be derived by computing the centrifugal force due to each component and equating them, thus:

(1) $Kw_1r_1n_1^2 = Kw_2r_2n_2^2$ where   $w$ = weight
        $r$ = radius of action
        $n$ = speed
        $K$ = a constant Subscript 1 refers to the unbalance force system. Subscript 2 refers to the counterbalance force system. $K$ and $n$ cancel, being equal on both sides, so that (2)   $w_1r_1 = w_2r_2$ for equal forces Thus, if these equal and opposite centrifugal forces lie in a common plane normal to the axis of rotation, it is possible to operate the machine at its most desirable machining speed without reference to the centrifugal forces and without setting up a dynamic unbalance and its attendant vibration problems.

It will also be understood that in the mass production of workpieces having an inherent unbalance, the exact center of gravity of unbalance in the workpiece may vary somewhat from part to part. As a practical matter, however, it is possible to establish a satisfactory antivibration effect according to this invention without having the centrifugal forces of the workpiece and the counterbalance exactly the same or exactly in a common plane, although it is desirable to maintain this relationship as nearly as possible for best results. It will also be appreciated that in a mass production machine producing a rotating workpiece it is highly desirable to construct and arrange the counterbalance to permit ready assembly and disassembly of the workpiece in the machine tool.

BRIEF DESCRIPTION OF THE DRAWINGS

In the drawings:

FIG. 1 is a side view of a lathe showing an unbalanced as received workpiece and the counterbalance mechanism of the present invention mounted in operative relation on the lathe;

FIG. 2 is an end view of the lathe, with the workpiece removed as viewed from line 2-2 of FIG. 1;

DESCRIPTION OF THE PREFERRED EMBODIMENTS OF THE INVENTION

Figure 3:
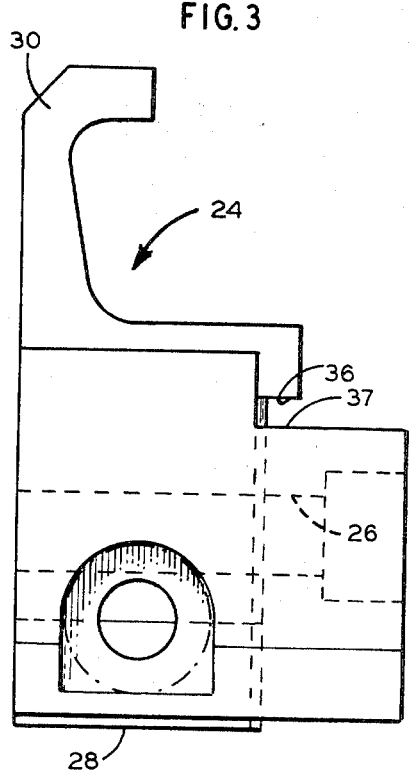
FIG. 3 is an enlarged side view of the counterbalance of the present invention.
Figure 4:
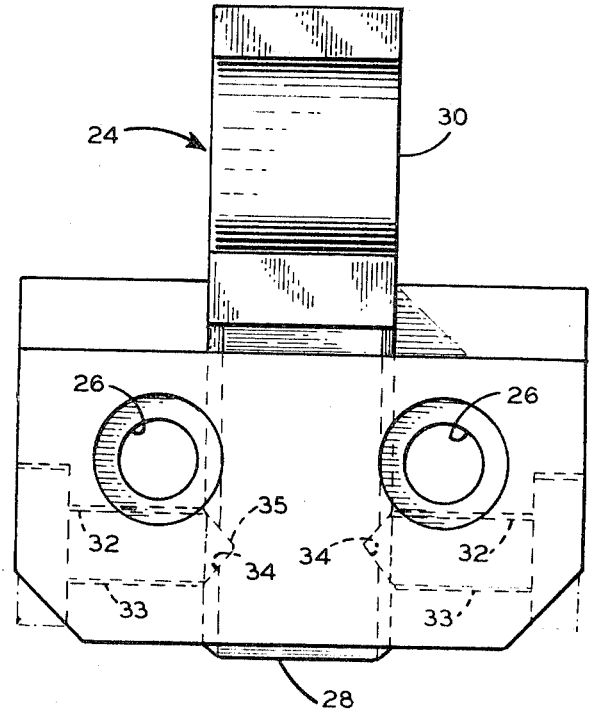
FIG. 4 is an end view of FIG. 3 as viewed from the right.

In the embodiment of the invention shown in FIGS. 1 and 2 a lathe 10 is shown with a typical workpiece 11 mounted for rotation in the lathe. It will be understood, of course, that work rotating tools other than a lathe may incorporate the counterbalance of the present invention and that other shapes of workpieces may be used. Actually, the workpiece 11 shown is utilized in the automotive industry as part of an automobile steering assembly. Such a part is initially formed by casting or forging and while each part is essentially of the same configuration as preceding and succeeding parts, they will vary somewhat in dimensions and contour. These variations could affect the amount of dynamic unbalance inherent in the part and during the machining process can affect the amount of undesirable vibration in the workpiece, but not to any very significant extent.

As shown in FIGS. 1 and 2, the headstock 12 of the lathe 10 is provided with a face plate 13 having an outwardly projecting conical center 14 thereon intended to engage a corresponding recess in the workpiece 11. The tailstock of the lathe is provided with a conical pointed center 15 to engage a corresponding recess in the workpiece 11 with the centers 14 and 15 defining the axis of rotation 16 of the workpiece. With the headstock 12 driven at a controlled rate of rotation, selected in accordance with the type of metal being machined, the type of cutting tool and the nature of the cut, the workpiece will be driven from the headstock 12. This may be accomplished by known arrangements, such as a chuck formed as part of the headstock, or as shown in the drawings, by arm 20 of the workpiece 11 which engages a locking member on the face of the headstock. As shown, a pair of circumferentially spaced flanges 17 and 18 mounted on the faceplate 13 engage the arm 20. In the example shown, the arm 20 is inserted in the recess 19 between the flanges 17 and 18 so that the workpiece is rotationally driven by the headstock. It will be understood the arm may be clamped in the recess by a member or under some circumstances the arm 20 may be locked in place by a set screw (not shown) passed through a flange 17 or 18 to force a side surface of the arm 20 against the companion flange. The choice of drive connection depends upon the part being machined, and upon the circumstances of the machining operation. In other words, slight effects of unbalance by reason of the type of connection between the arm 20 and drive member are relatively unimportant and may be ignored in the interest of reduced setup time. The counterbalance of the present invention will then be effective in permitting desired close tolerance machining at optimal machining rates.

In any workpiece, a center of inertia (also known as the center of gravity, center of mass, or center of balance) exists and can be located either by "cut and try" procedures or mathematically. When a symmetrical workpiece is rotated about its center of inertia the piece will be in balance. However, in the unsymmetric workpiece 11 as shown in FIG. 1, the axis 16 of rotation does not pass through the center of inertia. For purposes of illustration, suppose the radial position of the center of inertia with respect to the axis of rotation is represented by the numeral 22. When the workpiece is then rotated about the axis 16 the centrifugal force exerted by the unbalance of the workpiece can be calculated as the unbalanced mass concentrated at the center of inertia 22 times the rate of rotation squared times the radial distance between the axis of rotation and the center of inertia. This is the amount of force of unbalance, and in the present invention is compensated by an equal force exerted on the opposite side of the workpiece by the compensator 24.

The arrangement illustrated in FIGS. 1 to 5 includes a metal counterbalance assembly 24 attached to the faceplate 13 diametrically opposite the flanges 17 and 18 (note that this serves to locate the compensating force opposite to the unbalance force automatically). The member 24 is attached by bolts 25 to the faceplate 13. In its mounted position on the faceplate 13 the member 24 is provided with a slot 27 formed radially of the axis 16. Slot 27 receives a sliding counterweight 28 which is provided with a hooked portion 30 to engage the end of an arm 31 on the workpiece 11 (see FIG. 1). As shown, the sliding counterweight 28 is limited in its radial outward movement by a pair of spring loaded pins 32 operable in apertures 33 through the wall of the member 24 and opening into the slot 27 from diametrically opposite sides. The tip 34 of each pin will engage a groove 35 in the surfaces of the counterweight to limit the radial outward movement of the counterweight 28 in the slot 27.

Figure 5:
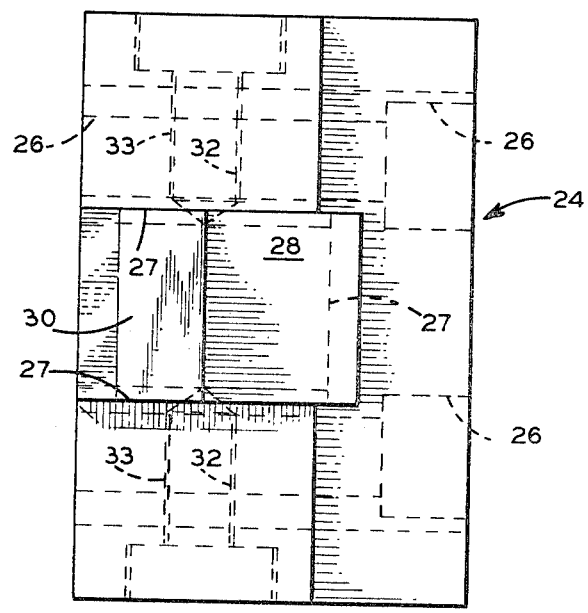
FIG. 5 is a top view of FIG. 3.

As shown particularly in FIG. 5, the slot 27 formed in the member 24 is open on one side so that the faceplate closes this side for sliding movement of the counterweight 28. It will be appreciated the member 24 may be positioned outwardly of the faceplate by the use of a shim plate (not shown), if this becomes desirable due to the axial location of the center of inertia 22. When such shimming is used to place the center of inertia of the counterweight 28 generally in the same plane normal to the axis of rotation as the center of inertia 22, the shim surfaces will also be machined. With such shim construction and arrangement radial movement of the sliding counterweight 28 during the insertion of a workpiece in the lathe will be facilitated and the counterweight will move as hereinafter described to facilitate machining operations. It will be noted the hooked end portion 30 of the counterweight is provided with a shoulder 36 to positively limit radial outward movement of the counterweight 28. If the detent action of the pins 32 fails to restrict outward movement the shoulder 36 will engage the adjacent surface 37 on the block 24 for safety.

It will be noted the center 14 assembly is cut as at 38 (FIG. 2) to provide clearance for the insertion of the arm 31, and to accommodate maximum inward movement of the hook portion 30 for assembly of the workpiece 11 in the lathe.

In the arrangement shown, the centrifugal force produced by rotation of the lathe 10 will cause the counterweight 28 to tend to move radially outwardly in the slot 27, with the hooked end portion 30 of the weight thereby engaging the arm 31. The entire faceplate and fixture assembly including faceplate 13, the flanges 17 and 18, the center 14, the housing of member 24, and the fixed bolts, detents, etc., are of selected mass, and radially positioned on the faceplate to be in balance, while the weight and radial portion of balance weight 28 are selected so as to compensate for the unbalance of the workpiece 11. In this connection, the counterweight 28 is intended to remain somewhere within its detent range during rotation of the faceplate. However, normal variations in the size or position of the arm 31 relative to the axis 16 will not drive the counterweight 28 to move outside its detent limit so that the balancing and stabilizing effect of the counterweight 28 will not be appreciably affected thereby. The pin 32 detent will limit excessive outer radial movement of the counterweight. At this point, a distinction between unbalance forces and distortion forces must be made. A part can run out (that is, its finished surface may deviate from true concentricity) for several reasons. In the first place, the part may be centered incorrectly, so that even if it is cut correctly and without generating disturbing forces, it is not concentric with the desired center. This can happen with incorrect fixturing, especially on very rough parts in which the fixturing grasps the part more or less at random. Another possibility is that the centering is correct—that is that the preset center holes which are joined by a previous operation do indeed define the desired center—but that the part is distorted by the fixturing, so that some of the material is forced into a bent condition. Thus when the tool passes over it, a shape is cut which is correct while the part is stressed but which forms all sorts of strange shapes when the stress is removed. Now when this happens there is another side effect possible which gets worse at high speeds, and this is the fact that the distortion causes a shift in the amount and location of unbalance since additional material (as in the case of the knuckle we have used as an example above, for instance) up the shank and far removed from the unbalanced arm is forced off center. In this case, even if the normal part unbalance is compensated by a device such as the subject of this invention, the added unbalance due to the movement of the distorted area will not be. Thus, parts with undesired runout will result.

The point of all this is that it is most desirable to keep the unbalance in a known location, so that it is almost always preferable to hold this sort of part between centers, and to drive it loosely, so that the unbalanced portion is allowed to float a little with respect to the fixturing.

Figure 6:
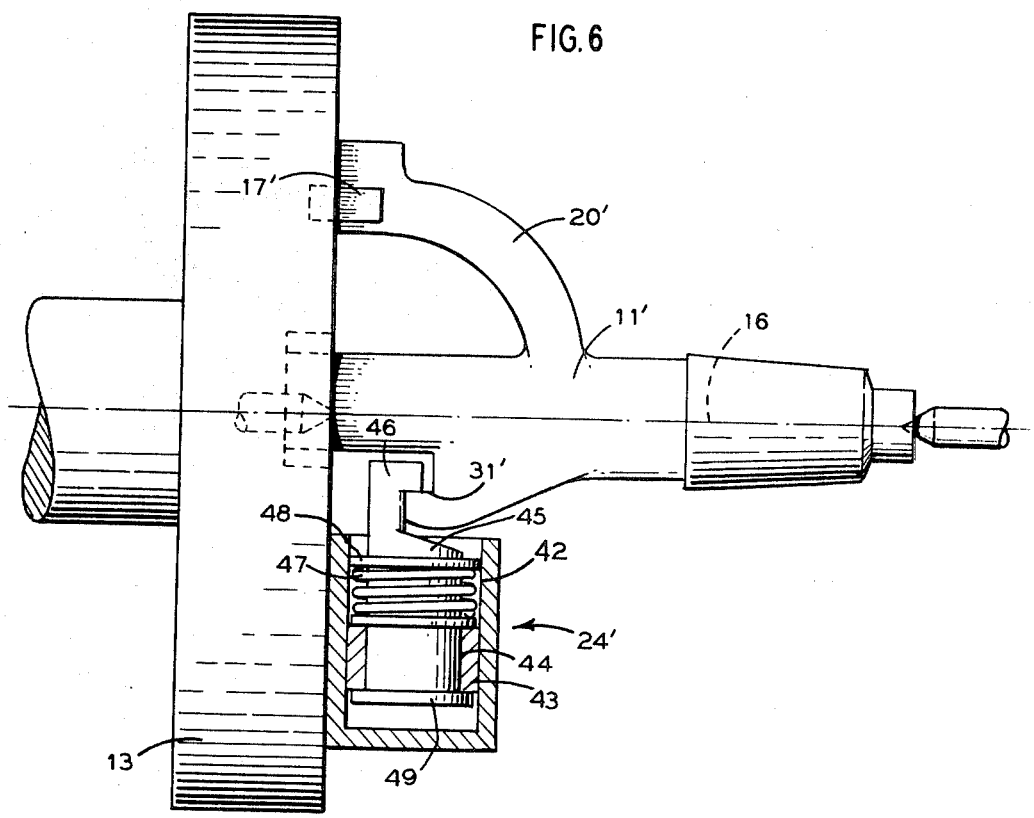
FIG. 6 is a schematic side view showing of a modified counterbalance assembly in a lathe.

A modified construction of the invention is illustrated in FIG. 6 wherein the flanges 17' and 18' can be used, as in the FIG. 1 arrangement. The axis of rotation 16 of the workpiece is established by the use of centers 14 and 15 as in FIG. 1.

The counterbalance of this modification includes a block 24' suitably secured to the faceplate 13 and provided with an opening 42 positioned so as to be radial to the axis of rotation 16. The opening 42 has a sleeve 43 with a cylindrical inner surface 44 in which is fitted a counterweight 45 radially slidable with respect to the axis of rotation. The counterweight 45 is constructed with a hooklike extension 46 at its inner end to engage the inner surface of an arm 31' on the workpiece 11'. The counterweight 45 is provided with a shoulder 48 engaged by a compression spring 47. As shown, the outer end of the spring 47 is in contact with the inner end of the sleeve 43 while the outer end contacts a shoulder 49 formed on the end of the counterweight. The idea here is to keep the hook 46 inward in a position in which loading is easy while the part is not rotating, so that only one hand is required to load the part.

Figure 7:
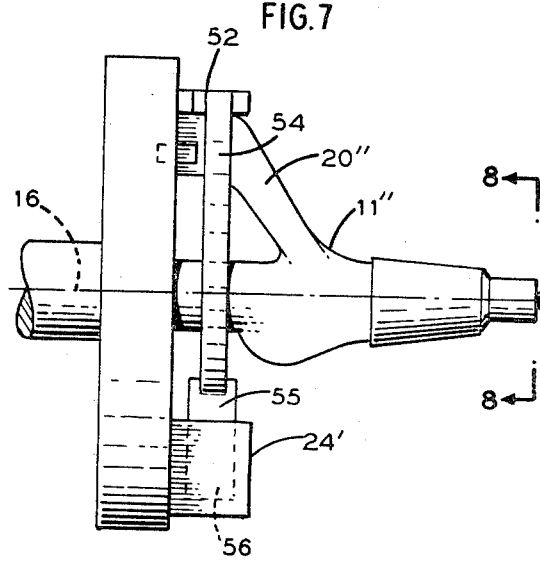
FIG. 7 is a schematic side view of a further modified counterbalance assembly in a lathe.
Figure 8:
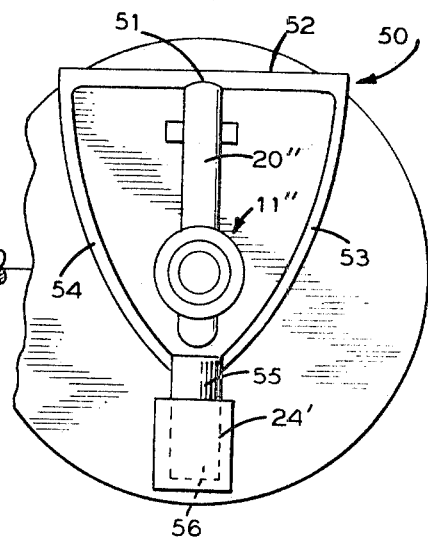
FIG. 8 is a section taken on line 8-8 of FIG. 7.

In the modification of the invention shown in FIGS. 7 and 8 it can be assumed that the workpiece 11" does not include an arm equivalent to the arm 31 or 31' as shown in FIGS. 1 and 6 respectively. Under such conditions it is necessary to attach the counterweight which may be of the construction of either FIGS. 1—5, or that of FIG. 6, to the workpiece 11" on the side opposite to that of the counterweight position. This means of attachment may take the form of a frame or bracket 50 which acts in effect like a bridle so that any tendency for the workpiece with the arm 20" to move outwardly from the axis of rotation 16 being restrained by the frame 50. Necessarily, as shown in FIG. 8, the frame 50 is attached to the arm 20" by the outer surface thereof engaging a depression 51 in a transverse beam 52 of the frame. The beam 52 extends outwardly on both sides of the arm 20" and is connected by rigid rods 53 and 54 to the inwardly extending portion 55 of the counterweight 56. As shown, in FIGS. 7 and 8, the form of the counterweight is illustrated as that disclosed in FIG. 6. It will, of course, be apparent that the detent type of counterweight such as shown particularly in FIGS. 3—5 may alternately be used. In this form of the invention, it will be clear that the total weight and position of beam 52, arms 53 and 54 and counterweight 56, proper, must all be considered in arriving at the equivalent counterweight effect, since these elements are, effectively one piece. To this end, the beam and arms 52, 53, 54 should be as light as possible so as not to require an excessively large counterweight 56 and assembly 24'.

It will be noted in each of the versions of the invention, a counterweight is provided so that the workpiece can be readily inserted into the tool for machining with the counterweight attached to the workpiece itself. Moreover, it will be noted that the center of inertia or the center of unbalance of the workpiece will generally lie in a plane perpendicular to the axis of rotation which also intersects the center of inertia of the counterweight. It has been found that the balancing arrangement of the present invention is particularly suitable for the mass production of unsymmetric parts where close machining tolerances are required of the finished workpiece. With the construction described, loss of time due to inserting and detaching workpieces is minimized while at the same time the effectiveness of the balance arrangement is exceptional in that it permits accelerated production rates of workpiece rotation without detriment either to the workpiece or to the machining apparatus.

What I claim is:

1. In a work rotating fixture for machining an unbalanced workpiece comprising means for mounting said workpiece for rotation about an axis of rotation, counterbalance means mounted on said workpiece mounting means in direct contact with the workpiece with said workpiece, said counterbalance means being located with its center of gravity on the opposite side of the axis of rotation of the center of gravity of unbalance of the said workpiece, the product of the values of mass and the radius between the center of gravity and the axis of rotation of both said workpiece unbalance and said counterbalance being substantially equal.

2. In a work rotating fixture according to claim 1 wherein the center of gravity of said workpiece unbalance and said counterbalance means lie in a substantially common plane normal to the axis of rotation.

3. In a work rotating fixture according to claim 1 wherein said counterbalance means includes a weight moveable in a direction radial to the axis of workpiece rotation, and means for limiting the outward radial movement of said weight.

4. In a work rotating fixture according to claim 3 wherein said radial movement limiting means comprises a detent engaging said weight at a fixed radius from said axis of rotation.

5. In a work rotating fixture according to claim 3 wherein said radial movement limiting means comprises a spring having one end engaging said weight and its opposite end fixed with respect to said axis of rotation.

6. In a work rotating fixture according to claim 1 wherein said counterbalance means includes a hook detachably attached to said workpiece.

7. In a work rotating fixture according to claim 6 wherein said workpiece has a projection on one side thereof opposite the center of gravity of said unbalance, and said hood detachably attaches to said projection.

8. In a work rotating fixture according to claim 6 wherein bridle means engage said workpiece on the side thereof containing the center of gravity of said unbalance, and said hook detachably attaches to said bridle.